US012614054B2

(12) United States Patent
Riedl et al.

(10) Patent No.: US 12,614,054 B2
(45) Date of Patent: Apr. 28, 2026

(54) CARD-SHAPED DATA CARRIER COMPRISING CERAMIC

(71) Applicant: GIESECKE+DEVRIENT EPAYMENTS GMBH, Munich (DE)

(72) Inventors: Josef Riedl, Attenkirchen (DE); Thomas Tarantino, Laufen (DE); Peter Tarantino, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/862,819

(22) PCT Filed: May 5, 2023

(86) PCT No.: PCT/EP2023/025215
§ 371 (c)(1),
(2) Date: Nov. 4, 2024

(87) PCT Pub. No.: WO2023/213443
PCT Pub. Date: Nov. 9, 2023

(65) Prior Publication Data
US 2025/0356159 A1     Nov. 20, 2025

(30) Foreign Application Priority Data
May 6, 2022     (DE) .................... 10 2022 001 595.1

(51) Int. Cl.
*G06K 19/077* (2006.01)
*B32B 9/00* (2006.01)
*B32B 27/30* (2006.01)
(52) U.S. Cl.
CPC ........ *G06K 19/07722* (2013.01); *B32B 9/005* (2013.01); *B32B 27/304* (2013.01); *B32B 2274/00* (2013.01); *B32B 2425/00* (2013.01)

(58) Field of Classification Search
CPC .... G06K 19/0772; G06K 19/00; B32B 9/005; B32B 27/304; G06Q 20/34
(Continued)

(56) References Cited

U.S. PATENT DOCUMENTS 5,830,548 A * 11/1998 Andersen ................ C04B 28/04
                                                       428/152
2007/0047037 A1* 3/2007 Yoshizawa ........... G03H 1/0011
                                                        359/2
(Continued)

FOREIGN PATENT DOCUMENTS

CN        105447559 A * 3/2016 ....... G06K 19/07726

OTHER PUBLICATIONS

Thyssenkrupp, "Technische Kunststoffe im Uberblick" (English: "Technical Plastics at a Glance"), Materials Services Plastics Germany, Oct. 1, 2019, pp. 46-49, retrieved from <https://ucpcdn.thyssenkrupp.com/_legacy/UCPthyssenkruppBAMXPlastics/assets.files/plastics/downloadbereich/0750_technische_kunststoffe_im_ueberblick. pdf>.

(Continued)

*Primary Examiner* — Edwyn Labaze
(74) *Attorney, Agent, or Firm* — Workman Nydegger

(57) ABSTRACT

A card-shaped data carrier includes an electronic chip module with at least one chip and a contact structure, and including a card body with an arrangement region for receiving the chip module, the chip module being arranged in the arrangement region of the card body, and the card body having at least one first plastics layer and at least one ceramic layer, the first plastics layer being formed from a brittle plastics material to adjust a fracture behavior of the card-shaped data carrier.

13 Claims, 2 Drawing Sheets

(58) Field of Classification Search
 USPC ........................................ 235/488, 380, 375
 See application file for complete search history.

(56)                          References Cited

U.S. PATENT DOCUMENTS

2015/0041546 A1*   2/2015  Herslow ................ G06K 19/02
                                                       428/338
2015/0339564 A1*  11/2015  Herslow ................... B32B 3/14
                                                        156/60
2019/0236434 A1*   8/2019  Lowe .............. G06K 19/07792
2021/0110231 A1    4/2021  Finn
2023/0103318 A1*   4/2023  Coleman ............... G06K 19/02

OTHER PUBLICATIONS

International Search Report from corresponding PCT Application
No. PCT/EP2023/025215, Aug. 22, 2023.

* cited by examiner

CARD-SHAPED DATA CARRIER COMPRISING CERAMIC

BACKGROUND

The present invention relates to a card-shaped data carrier, in particular a smart card, which comprises ceramic.

A large number of card-shaped data carriers are known from the prior art, for example smart cards, chip cards, dual interface cards, integrated circuit cards or identification cards.

Furthermore, it is known, for the production of card-shaped data carriers, to use different components for contact-based and/or contactless data transfer, such as for example a chip module with a chip and a contact structure, a card body with the chip module arranged thereon, and/or further components, such as for example an antenna or a capacitor for contactless data transfer.

It is known that such data carriers or cards are generally produced from thermoplastic materials such as polyvinyl chloride (PVC) and polyethylene terephthalate (PET). What is problematic is that the surfaces of the data carriers composed of plastics material may easily be scratched by mechanical influences or damaged by chemical substances, such as e.g. acids or alkaline solutions. Data carriers in accordance with the prior art are very sensitive to high temperatures, since they e.g. easily deform if they are exposed to an excessively high temperature.

It is furthermore known to use ceramic or ceramic materials for card-shaped data carriers. In particular, it is possible to use card films composed of ceramic as cover films or overlay films. These outer ceramic films are thin, however, and may therefore easily break or become cracked. In this context, what has been found to be disadvantageous is that ceramic has an undefined fracture behavior. Consequently, there is the possibility for a user of a card-shaped data carrier to injure themselves on the ceramic fragments or cracks, since these may have sharp edges.

SUMMARY

Therefore, the object of the present invention is to specify a card-shaped data carrier, in particular a smart card, comprising a ceramic material for which safe use can be provided and the risk of injury of a user can be reduced.

Embodiments and developments of the invention are specified in the dependent claims and disclosed in relation to the description and the figures.

In accordance with one aspect of the invention, a card-shaped data carrier, in particular a smart card, is provided, comprising an electronic chip module with at least one chip and a contact structure, and comprising a card body with an arrangement region for receiving the chip module, the chip module being arranged in the arrangement region of the card body, and the card body having at least one first plastics layer and at least one ceramic layer, the first plastics layer being formed from a brittle plastics material to adjust a fracture behavior of the card-shaped data carrier.

In the context of the application, the terms first plastics layer and brittle plastics material may be used analogously.

In other words, the first plastics layer may also be referred to as brittle plastics layer or as brittle plastics material in the context of the application.

In the context of the application, the chip module comprises at least one chip and a contact structure. This allows contact-based data transfer between the smart card and a reader. In particular, in this case the chip is preferably connected to contacts of the contact structure via wires. The number, size and position of the contacts can be defined by international standards in order that the function of the smart card can be ensured in any reader. However, it is possible to provide further components for the chip module, such as for example a capacitor or an antenna (in the form of a coil) for capacitive or inductive contactless data transfer. A contactless smart card can communicate with a reader by way of electromagnetic waves, the smart card being able to function in a manner similar to a transceiver. In particular, electromagnetic waves emitted by the reader generate an oscillating electromagnetic field which generates an oscillating electrical voltage in the coil or antenna of the chip module, for example, whereby the chip can be supplied with current. In this case, the oscillations of the voltage can be captured as a signal and converted into data in the chip. These data can in turn be processed in the chip and converted into changes in the electromagnetic field, which can in turn be captured by the reader and converted into data. Overall, therefore, the chip module can enable contact-based and/or contactless data transfer.

In the context of the application, provision is preferably made for the arrangement region for receiving the chip module to be formed by a cutout or a module opening in the card body in which the chip module is received. Preferably, the card body can be formed by a plurality of layers, a cutout being provided in the layers in order to receive the chip module therein. This has the advantage of a protected and space-saving arrangement of the chip module within the card body of the card-shaped data carrier.

The plurality of layers of the card body comprise at least one first plastics layer and at least one ceramic layer. For example, two ceramic layers can be provided, which can be provided in particular as outer layers of the card body. This has the advantage that the ceramic layers afford protection against e.g. scratching of a surface of the card-shaped data carrier, since the ceramic layers are generally very hard. Furthermore, an outer ceramic layer protects the plastics layer against the influence of chemical substances, such as e.g. acids or alkaline solutions, since the ceramic layer is insensitive to the influence of chemical substances. For example, as a result, the electronics can preferably be arranged in or on the plastics layer. A further advantage is that the ceramic layer generally serves as an acoustic authenticity feature when the card-shaped data carrier falls e.g. onto a hard support surface. Furthermore, a plurality of plastics layers can preferably be provided, which are arranged in particular in the interior of the card body. In the context of the application, the ceramic layer comprises ceramic or a ceramic material.

The invention has the advantage that the use of a brittle plastics layer enables the fracture behavior of the card body and thus also of the card-shaped data carrier to be defined or adjusted. As the brittle plastics material of the plastics layer interacts with the hard material of the ceramic of the ceramic layer, in the event of external loading it is possible to attain overall a brittle fracture of the card body or of the card-shaped data carrier. In particular, a brittle fracture denotes an abruptly occurring material failure. In other words, the card-shaped data carrier may break apart in a manner that is apparent and visible to the user. For example, the card-shaped data carrier may break into two halves in a clearly discernible manner on account of the brittle fracture. This has the advantage that the user can immediately recognize that the card-shaped data carrier has broken and the user can immediately begin correspondingly cautious handling of the card-shaped data carrier. In particular, a clearly discernible large crack or fracture of the card-shaped data carrier can be attained by means of a brittle fracture, whereby the occurrence of a large number of small, poorly discernible and sharp-edged cracks or fracture points can be avoided. Consequently, the risk of injury for the user can be significantly reduced by the adjustment of the fracture behavior.

With preference, provision can be made for the brittle plastics material to be formed by a plastics material which has an elongation at break of at least 0.1% and at most 50%, in particular of at least 0.1% and at most 20%, preferably of 15%. In the context of the application, elongation at break denotes a linear extension of the respective material, in particular of the plastics material, indicated in %. In other words, elongation at break describes a deformability as a material property. The elongation at break can preferably be used to differentiate between brittle and elastic materials. Brittle materials preferably have a low elongation at break, whereas elastic materials may have a high elongation at break. In particular, brittle materials may have only a low linear extension before a crack or fracture of the material occurs. This may result in particular from the fact that brittle materials typically have great hardness and, consequently, a brittle material can deform or stretch only to a small extent. The described brittle fracture of the card-shaped data carrier can advantageously be attained on account of the low elongation at break.

Preferably, provision can be made for the brittle plastics material to be formed by a plastics material which has a tensile strength of at least 50 MPa, in particular 70 MPa. In the context of the application, tensile strength (in particular also tear strength) may describe a maximum mechanical tensile stress that a material can withstand. In other words, tensile strength may describe a kind of loading capacity as a material property. Advantageously, brittle plastics materials may have a high tensile strength. This results in particular from the fact that brittle materials may typically have great hardness and, consequently, also a high loading capacity.

Advantageously, provision can be made for the brittle plastics material to be formed by a plastics material which has a modulus of elasticity of at least 500 MPa. In the context of the application, the modulus of elasticity may be regarded as a kind of characteristic value regarding the extent to which a material may yield to a deformation in the event of an external force action. In other words, the modulus of elasticity may describe a kind of magnitude of a resistance to deformation. In particular, under identical loading an elastic material may yield to a greater extent than a hard and brittle material. In other words, an elastic plastics material may have a lower resistance to deformation than a brittle plastics material. To put it another way, therefore, an elastic plastics material has a low modulus of elasticity and a brittle plastics material has a high modulus of elasticity.

In summary, it can be stated that the aforementioned material properties of elongation at break, tensile strength and modulus of elasticity may describe the brittle material property of the plastics material and overall foster a brittle fracture of the card-shaped data carrier. This advantageously reduces the risk of injury for the user of the card-shaped data carrier.

In one particularly preferred embodiment, provision can be made for the brittle plastics material to be formed by polystyrene or a light-modified PVC plastics material or a highly crystalline plastics material. For example, polystyrene may have a tensile strength of approximately 55 MPa, an elongation at break of approximately 3% and a modulus of elasticity of approximately 3200 MPa. In general, further brittle plastics materials are conceivable for use for the first plastics layer. It is likewise conceivable to make a plastics material brittle by way of a high temperature or the introduction of light or UV radiation. In particular, the chain length of the molecules of the plastics material may play a part here. For example, during a very hot extrusion, the chain length of the molecules may be reduced by chain cleavage. The shorter the chain length of the molecules, the more brittle the material may be. The chain length may likewise be reduced by chain cleavage by way of the introduction of light or UV radiation. Preferably, a mean molar mass distribution of at most 20,000 g/mol is provided for the brittle plastics material. The molar mass distribution may preferably be analyzed by means of gel permeation chromatography (GPC).

It is likewise preferably conceivable for the ceramic layer to be designed to be transparent. This has the advantage that designs or inscriptions arranged at or on the plastics layer are readily discernible from the outside.

With preference, provision can be made for the ceramic layer to be bonded to the first plastics layer by means of an adhesive. The advantage of bonding the plastics layer to the ceramic layer by way of an adhesive resides in simple processability of the adhesive and a permanent bonding can preferably be realized. The ceramic layer can be e.g. individually placed onto the plastics layer and adhesively bonded thereto.

Alternatively or additionally, provision can be made for the card body to have at least one second plastics layer, the second plastics layer being formed from an elastic plastics material.

In the context of the application, the terms second plastics layer and elastic plastics material may be used analogously.

In other words, the second plastics layer may also be referred to as elastic plastics layer or as elastic plastics material in the context of the application. The use of an elastic plastics material has the advantage that for example ceramic fragments of the brittle fracture of the ceramic layer and of the brittle plastics layer can be bound to the elastic plastics layer. As described above, the ceramic layer and the brittle plastics layer could break into two halves on account of a brittle fracture, but these broken halves could remain at the elastic plastics layer. In particular, this can afford the advantage that the broken layers stick to the elastic plastics layer and do not fall apart in a dispersed manner. It is thus possible to avoid in particular a situation in which dispersed ceramic splinters may fall off and injure the user in the event of a fracture of the card-shaped data carrier. Consequently, the elastic plastics layer can likewise contribute to adjusting the fracture behavior of the card-shaped data carrier. In other words, a specific fracture behavior of the card-shaped data carrier can be realized.

Preferably, provision is made for the elastic plastics material to be formed by a plastics material which has an elongation at break of at least 100%, preferably of 500%. Elastic materials preferably have a high elongation at break. In particular, elastic materials may have a very large linear extension before a crack or fracture of the material occurs. On account of the high elongation at break, it is advantageously possible to attain the described effect that, in the event of a brittle fracture, the broken ceramic layer and the broken brittle plastics layer can be bound to the elastic plastics layer.

Advantageously, provision can be made for the elastic plastics material to be formed by a plastics material which has a tensile strength of at most 50 MPa, in particular 20

MPa. In particular, elastic plastics materials may have a lower tensile strength than brittle plastics materials.

Furthermore, provision can preferably be made for the elastic plastics material to be formed by a plastics material which has a modulus of elasticity of at most 200 MPa, in particular 100 MPa. Since in particular an elastic material may yield to a greater extent than a hard and brittle material, an elastic plastics material advantageously has a lower resistance to deformation and therefore a low modulus of elasticity.

With preference, provision is made for the elastic plastics material to be formed by a thermoplastic elastomer, in particular thermoplastic polyurethane or thermoplastic polyester. For example, thermoplastic polyurethane may have a tensile strength of approximately 45 MPa, and elongation at break of approximately 300% and a modulus of elasticity of approximately 15 MPa. In general, further elastic plastics materials are conceivable for use for the second plastics layer. For example, vulcanized materials can also be used. Elastic plastics materials may typically have a long chain length of the molecules of the plastics materials. The longer the chain length of the molecules, the more elastic the material may be. Preferably, a mean molar mass distribution of at least 20,000 g/mol is provided for the elastic plastics material.

In one particularly preferred embodiment, provision is made for the card body to be formed from a plurality of layers, the layer sequence comprising an outer ceramic layer, an adhesive, a first plastics layer, a second plastics layer, a further first plastics layer, a further adhesive and a further outer ceramic layer. In other words, in this case, the second plastics layer comprising the elastic plastics material can be provided as an inner or centrally arranged layer of the card body. By way of example, a first plastics layer comprising the brittle plastics material is provided on each of the two opposite surfaces of the second plastics layer. To put it another way, the second plastics layer is arranged between two first plastics layers. A ceramic layer is arranged at the respective first plastics layer by means of the adhesive. Consequently, the ceramic layers may form outer layers of the card body. In this case, the inner plastics layers serve for adjusting the fracture behavior of the card body or of the card-shaped data carrier. As described above, the two first plastics layers comprising the brittle plastics material may bring about a brittle fracture, in particular. The centrally arranged second plastics layer comprising the elastic plastics material may ensure that the broken layers remain at the elastic plastics layer.

BRIEF DESCRIPTION OF THE DRAWINGS

The present invention is described below with reference to the accompanying figures by way of example in the context of embodiments. It goes without saying that individual features of the embodiments, if technically feasible, can be freely combined with one another without departing from the scope of the present invention. Elements having the same function and mode of operation are provided with the same reference signs in the figures. In the figures schematically below.

DETAILED DESCRIPTION OF VARIOUS EMBODIMENTS

Figure 1:
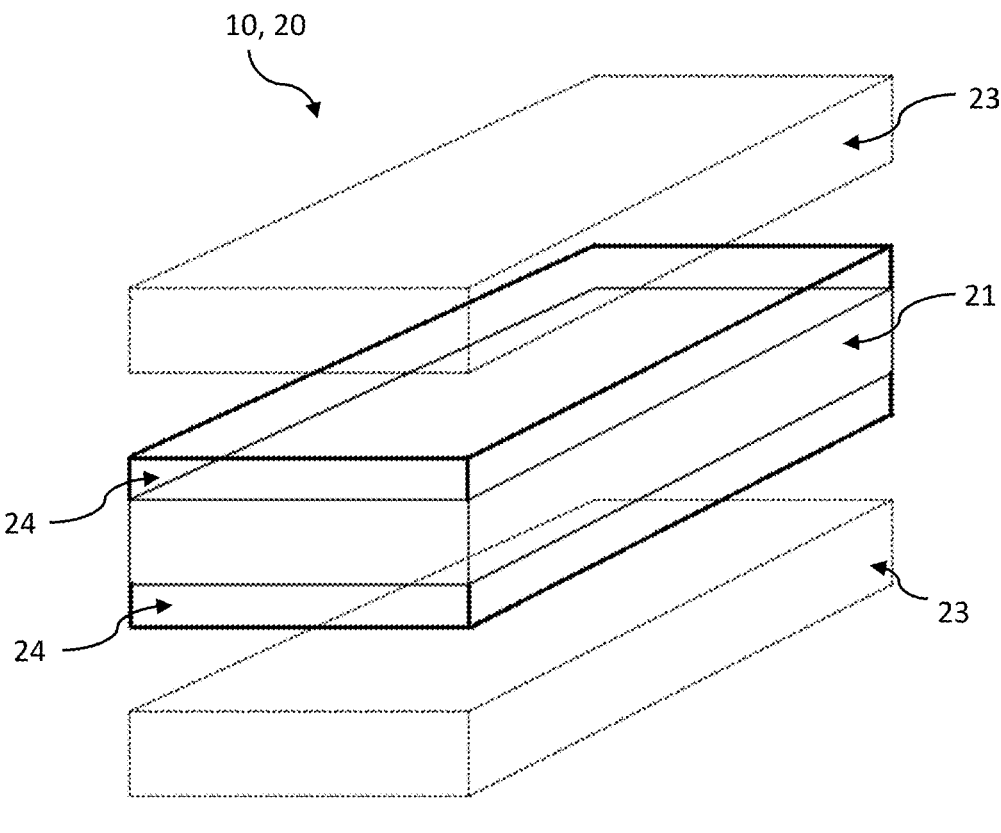
FIG. 1 shows a perspective exploded view of a card-shaped data carrier according to one exemplary embodiment according to the invention.

FIG. 1 shows a perspective exploded view of a card-shaped data carrier 10 according to one exemplary embodiment according to the invention. The card-shaped data carrier 10 is provided as a smart card, by way of example.

By way of example, the card-shaped data carrier 10 comprises an electronic chip module (not illustrated) with at least one chip (not illustrated) and a contact structure (not illustrated). In particular, contact-based data transfer can be realized by means of the chip module. It is possible to provide in particular further components for contactless data transfer.

Furthermore, the card-shaped data carrier 10 comprises a card body 20 with an arrangement region (not illustrated) for receiving the chip module, the chip module being arranged in the arrangement region of the card body 20.

Furthermore, the card body 20 has a plurality of layers. By way of example, one first plastics layer 21 and two ceramic layers 23 are provided. The first plastics layer 21 is arranged in the interior of or centrally in the card body 20. The two ceramic layers 23 are arranged at the exterior of the card body 20. In other words, the first plastics layer 21 is arranged between the ceramic layers 23. The ceramic layers 23 are each bonded to the first plastics layer 21 by means of an adhesive 24. Furthermore, the ceramic layers 23 are designed to be transparent, by way of example. Furthermore, the outer ceramic layers 23 protect the first plastics layer 21 against the influence of chemical substances, such as e.g. acids or alkaline solutions. By way of example, the chip module can thus preferably be arranged in or at the first plastics layer 21.

By way of example, provision is made for the first plastics layer 21 to be formed from a brittle plastics material to adjust a fracture behavior of the card-shaped data carrier 10. Preferably, the brittle plastics material is formed by polystyrene. For example, polystyrene may have a tensile strength of approximately 55 MPa, an elongation at break of approximately 3% and a modulus of elasticity of approximately 3200 MPa.

The use of a first plastics layer 21 comprising a brittle plastics material has the advantage that the fracture behavior of the card body 20 and thus also of the card-shaped data carrier 10 can be defined or adjusted in the event of external loading. As the brittle plastics material of the first plastics layer 21 interacts with the hard material of the ceramic layers 23, in the event of external loading it is possible to attain overall a brittle fracture of the card body 20 or of the card-shaped data carrier 10. Such a brittle fracture is illustrated by way of example in FIG. 2.

Figure 2:
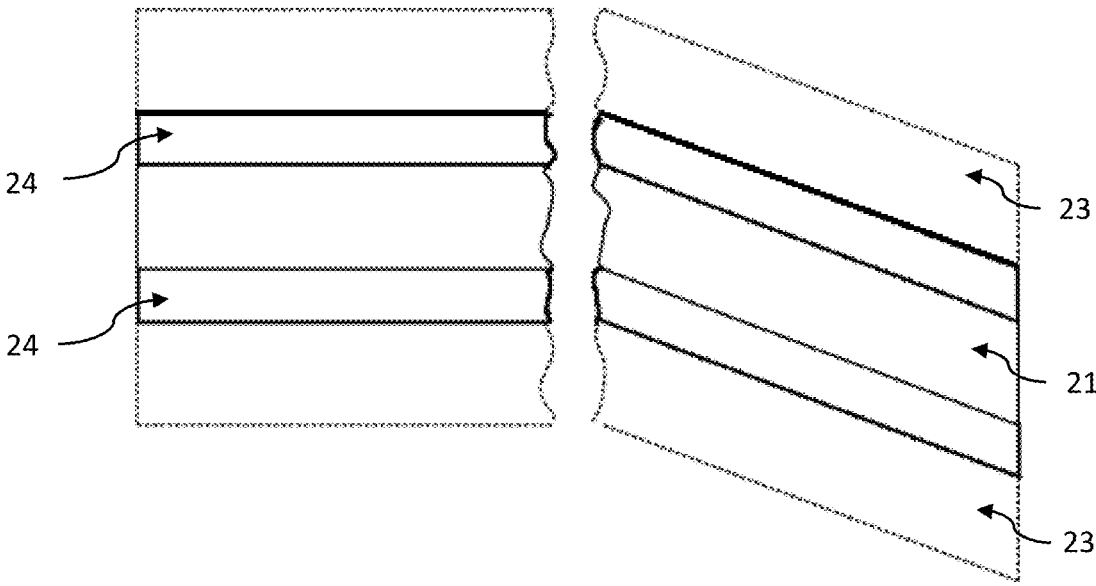
FIG. 2 shows a cross-sectional view of the card-shaped data carrier according to FIG. 1 with a defined fracture behavior.

FIG. 2 shows a cross-sectional view of the card-shaped data carrier 10 according to FIG. 1 with a defined fracture behavior, or a brittle fracture. By way of example, the card-shaped data carrier 10 has broken apart in a manner evident and visible to a user. In particular, the card-shaped data carrier 10 has broken into two halves in a clearly discernible manner on account of the brittle fracture. In other words, a complete crack along a vertical direction through the card body 20 has arisen.

Adjusting the fracture behavior or enabling a brittle fracture of the card body 20 has the advantage that the user can immediately recognize that the card-shaped data carrier 10 has immediately broken and the user can immediately begin correspondingly cautious handling of the card-shaped data carrier 10. In particular, the occurrence of a large number of small, poorly discernible and sharp-edged cracks or fracture points can be avoided by means of the brittle fracture. Consequently, the risk of injury for the user can be significantly reduced by the adjustment of the fracture behavior.

Figure 3:
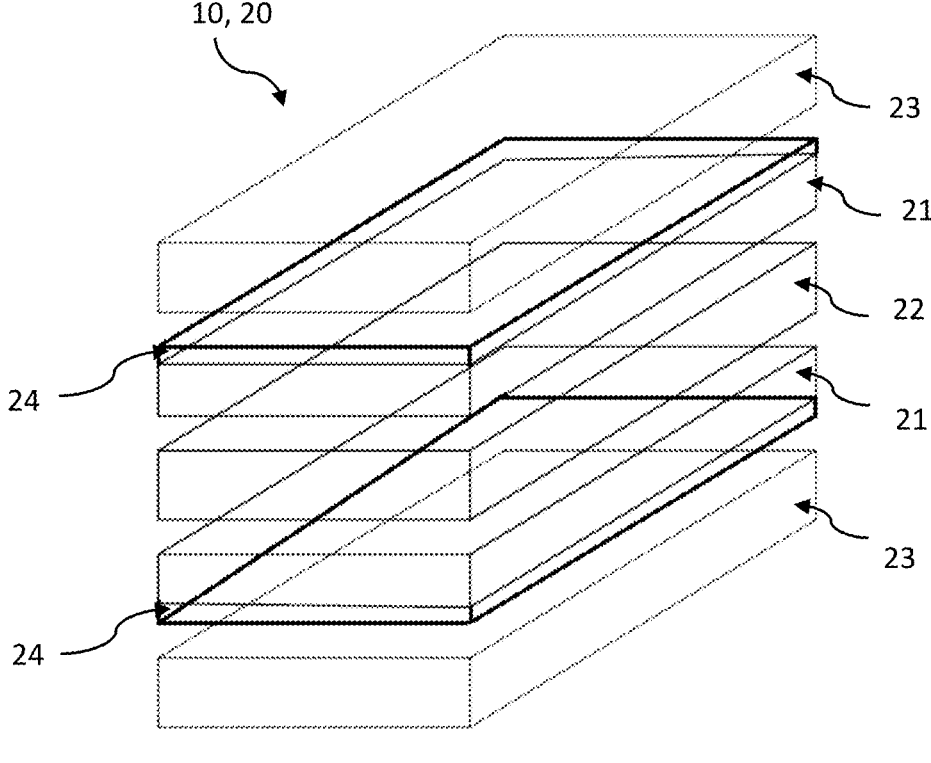
FIG. 3 shows a perspective exploded view of a card-shaped data carrier according to a further exemplary embodiment according to the invention.

FIG. 3 shows a perspective exploded view of a card-shaped data carrier 10 according to a further exemplary embodiment according to the invention. The card-shaped data carrier 10 is provided as a smart card, by way of example.

By way of example, the card-shaped data carrier 10 comprises an electronic chip module (not illustrated) with at least one chip (not illustrated) and a contact structure (not illustrated). In particular, contact-based data transfer can be realized by means of the chip module. It is possible to provide in particular further components for contactless data transfer.

Furthermore, the card-shaped data carrier 10 comprises a card body 20 with an arrangement region (not illustrated) for receiving the chip module, the chip module being arranged in the arrangement region of the card body 20.

Furthermore, the card body 20 has a plurality of layers. By way of example, two first plastics layers 21, one second plastics layer 22 and two ceramic layers 23 are provided. The second plastics layer 22 is arranged in the interior of or centrally in the card body 20. The two ceramic layers 23 are arranged at the exterior of the card body 20. A respective first plastics layer 21 is arranged between the second plastics layer 22 and each outer ceramic layer 23. The ceramic layers 23 are each bonded to the first plastics layers 21 by means of an adhesive 24.

In other words, the layer sequence of the card body 20 comprises an outer ceramic layer 23, an adhesive 24, a first plastics layer 21, a second plastics layer 22, a further first plastics layer 21, a further adhesive 24 and a further outer ceramic layer 23.

Furthermore, the ceramic layers 23 are designed to be transparent, by way of example. Furthermore, the outer ceramic layers 23 protect the first plastics layers 21 against the influence of chemical substances, such as e.g. acids or alkaline solutions. By way of example, the chip module can thus preferably be arranged in or at one of the first plastics layers 21.

By way of example, provision is made for the first plastics layers 21 each to be formed from a brittle plastics material to adjust a fracture behavior of the card-shaped data carrier 10. Preferably, the brittle plastics material is formed by polystyrene. For example, polystyrene may have a tensile strength of approximately 55 MPa, an elongation at break of approximately 3% and a modulus of elasticity of approximately 3200 MPa.

Furthermore, provision is made for the second plastics layer 22 to be formed from an elastic plastics material. Preferably, the elastic plastics material is formed by thermoplastic polyurethane. For example, thermoplastic polyurethane may have a tensile strength of approximately 45 MPa, and elongation at break of approximately 300% and a modulus of elasticity of approximately 15 MPa.

The use of an elastic plastics material for the second plastics layer 22 has the advantage that for example ceramic fragments of a brittle fracture—caused by an external loading—of the ceramic layers 23 and of the brittle plastics

Figure 4:
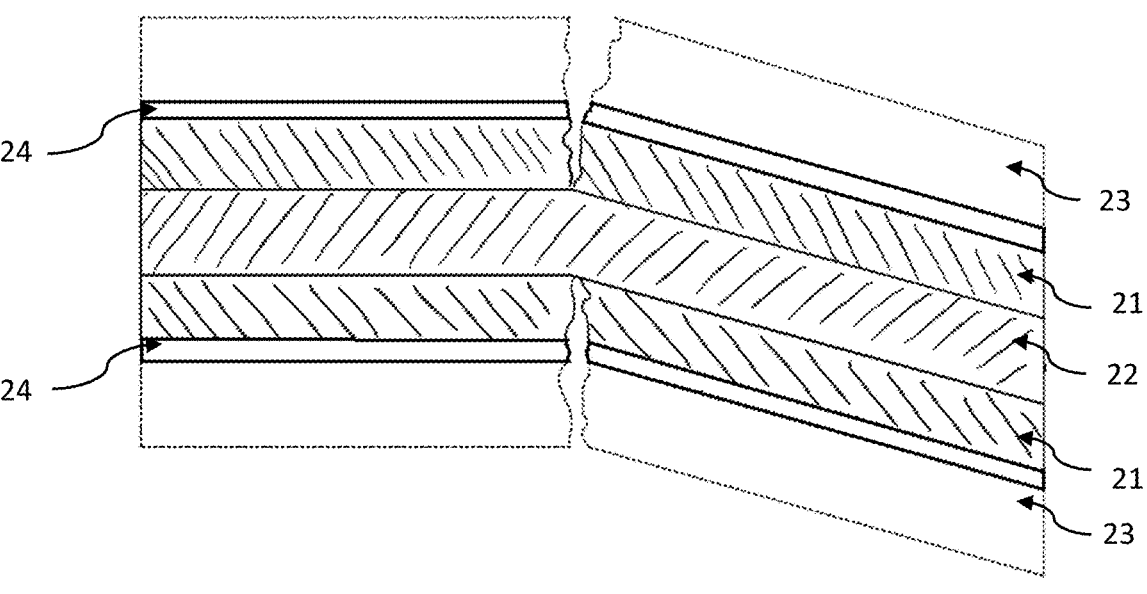
FIG. 4 shows a cross-sectional view of the card-shaped data carrier according to FIG. 3 with a defined fracture behavior.

8 layers 21 can be bound to the centrally arranged elastic plastics layer 22. As described in relation to FIG. 1, the ceramic layers 23 and the brittle first plastics layers 21 could break into two halves on account of a brittle fracture, but these broken halves could remain at the elastic plastics layer 22. This is illustrated by way of example in FIG. 4. In this case, FIG. 4 shows a cross-sectional view of the card-shaped data carrier 10 according to FIG. 3 with a defined fracture behavior.

In particular, the broken layers 21, 23 can stick to the elastic second plastics layer 22 and cannot fall apart in a dispersed manner. It is thus possible to avoid in particular a situation in which dispersed ceramic splinters may fall off and injure the user in the event of a fracture of the card-shaped data carrier 10. Consequently, the elastic second plastics layer 22 can serve for adjusting the fracture behavior of the card-shaped data carrier 10. Consequently, the risk of injury for the user can be additionally reduced by the adjustment of the fracture behavior.

LIST OF REFERENCE SIGNS

10 Card-shaped data carrier
20 Card body
21 First plastics layer
22 Second plastics layer
23 Ceramic layer
24 Adhesive

The invention claimed is:

1. A card-shaped data carrier, comprising an electronic chip module with at least one chip and a contact structure, and comprising a card body with an arrangement region for receiving the chip module, the chip module being arranged in the arrangement region of the card body, and the card body having at least one first plastics layer and at least one ceramic layer, the first plastics layer being formed from a brittle plastics material to adjust a fracture behavior of the card-shaped data carrier, wherein the card body has at least one second plastics layer, the second plastics layer being formed from an elastic plastics material, wherein the elastic plastics material is formed by a plastics material which has an elongation between 100% and 500%.

2. The card-shaped data carrier according to claim 1, wherein the brittle plastics material is formed by a plastics material which has an elongation at break of at least 0.1% and at most 50.

3. The card-shaped data carrier according to claim 1, wherein the brittle plastics material is formed by a plastics material which has a tensile strength of at least 50 MPa.

4. The card-shaped data carrier according to claim 1, wherein the brittle plastics material is formed by a plastics material which has a modulus of elasticity of at least 500 MPa.

5. The card-shaped data carrier according to claim 1, wherein the brittle plastics material is formed by polystyrene or a light-modified PVC plastics material or a highly crystalline plastics material.

6. The card-shaped data carrier according to claim 1, wherein the ceramic layer is designed to be transparent.

7. The card-shaped data carrier according to claim 1, wherein the ceramic layer is bonded to the first plastics layer by means of an adhesive.

8. The card-shaped data carrier according to claim 1, wherein the elastic plastics material is formed by a plastics material which has a tensile strength of at most 50 MPa.

9. The card-shaped data carrier according to claim 1, wherein the elastic plastics material is formed by a plastics material which has a modulus of elasticity of at most 200 MPa.

10. The card-shaped data carrier according to claim 1, wherein the elastic plastics material is formed by a thermoplastic elastomer.

11. The card-shaped data carrier according to claim 1, wherein the card body is formed from a plurality of layers, the layer sequence comprising an outer ceramic layer, an adhesive, a first plastics layer, a second plastics layer, a further first plastics layer, a further adhesive and a further outer ceramic layer.

12. A card-shaped data carrier, comprising an electronic chip module with at least one chip and a contact structure, and comprising a card body with an arrangement region for receiving the chip module, the chip module being arranged in the arrangement region of the card body, and the card body having at least one first plastics layer and at least one ceramic layer, the first plastics layer being formed from a brittle plastics material to adjust a fracture behavior of the card-shaped data carrier, wherein the fracture behavior is controlled to provide a complete tear through the card body, breaking the card-shaped data carrier into two pieces.

13. A card-shaped data carrier, comprising an electronic chip module with at least one chip and a contact structure, and comprising a card body with an arrangement region for receiving the chip module, the chip module being arranged in the arrangement region of the card body, and the card body having at least one first plastics layer and at least one ceramic layer, the first plastics layer being formed from a brittle plastics material to adjust a fracture behavior of the card-shaped data carrier, wherein the card body is formed from a plurality of layers, the layer sequence comprising an outer ceramic layer, an adhesive, a first plastics layer, a second plastics layer, a further first plastics layer, a further adhesive and a further outer ceramic layer.

* * * * *